No. 789,894. PATENTED MAY 16, 1905.
J. WILLIAMS.
CHAFING PLATE FOR WAGONS.
APPLICATION FILED OCT. 25, 1904.

WITNESSES —
Howard E. Savage.
Sydney E. Taft.

INVENTOR —
John Williams.
by his Attorney,
Charles S. Gooding.

No. 789,894.

Patented May 16, 1905.

UNITED STATES PATENT OFFICE.

JOHN WILLIAMS, OF BOSTON, MASSACHUSETTS.

CHAFING-PLATE FOR WAGONS.

SPECIFICATION forming part of Letters Patent No. 789,894, dated May 16, 1905.

Application filed October 25, 1904. Serial No. 229,897.

*To all whom it may concern:*

Be it known that I, JOHN WILLIAMS, a citizen of the United States, residing at Boston, in the county of Suffolk and State of Massachusetts, have invented new and useful Improvements in Chafing-Plates for Wagons, of which the following is a specification.

The object of this invention is to provide an improved construction in wagons, carriages, and the like whereby the nuts are prevented from rotating upon bolts, which secure the springs to the axles of said wagons, said improvement consisting in a chafing-plate so formed and located that while it performs all the functions of the chafing-plate as ordinarily constructed performs in addition thereto the function of preventing the nuts from rotating upon said bolts.

The invention consists in the combination and arrangement of parts set forth in the following specification, and particularly pointed out in the claims thereof.

Figure 1:
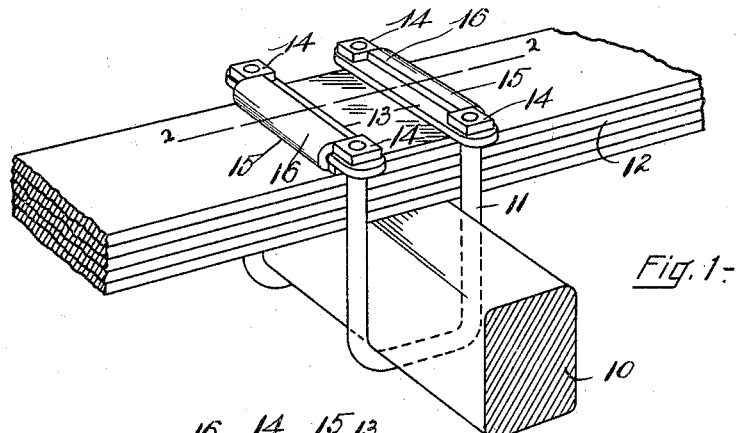
Figure 2:
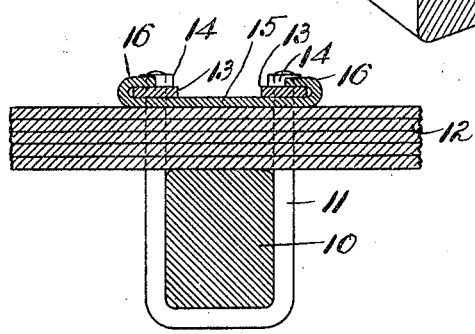
Figure 3:
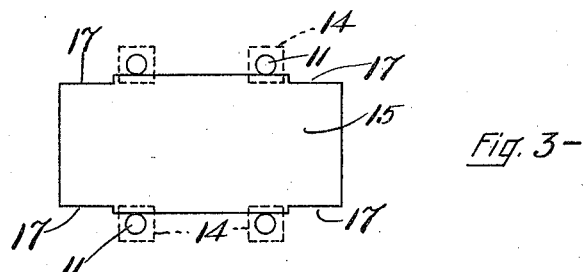
Figure 4:
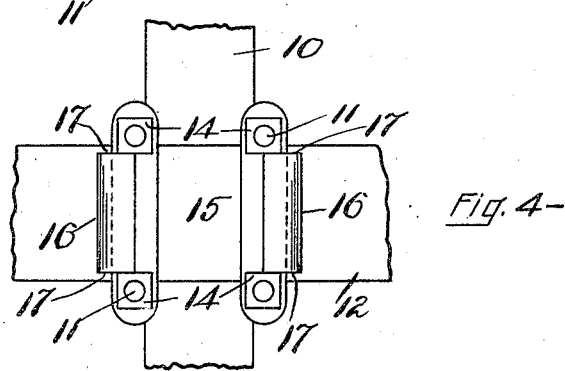

Referring to the drawings, Figure 1 is a perspective view of a portion of a wagon-axle and spring, together with the U-shaped bolts, cross-plates, and my improved chafing-plate attached thereto. Fig. 2 is a section, partly in elevation, taken on line 2 2 of Fig. 1. Fig. 3 is a plan view of my improved lock-plate before the ends thereof are bent, together with the bolts by which the different parts are held together. Fig. 4 is a plan view of the parts illustrated in Figs. 1 and 2.

Like numerals refer to like parts throughout the several views of the drawings.

In the drawings, 10 is the axle of an ordinary wagon. 11 11 are U-shaped bolts extending around the under side of said axle and upwardly along the opposite edges of the flat spring 12, the upper ends of the bolts 11 11 extending through cross-plates 13 13 and having nuts 14 14 in screw-threaded engagement therewith. The cross-plates 13 extend transversely of the spring 12 upon the opposite side thereof from that upon which the axle 10 is located, and between said cross-plates and the top of said spring is located a chafing-plate, which also is formed to act as a locking-plate to prevent the nuts from rotating upon the bolts 11. The locking-plate 15 is of substantially the same width as the spring 12 throughout its entire length, except at the opposite ends thereof, where it is provided with notches 17, located upon opposite edges, respectively, and at opposite ends of said locking-plate. The main portion of said locking-plate, therefore, is of the same width as the spring, so that the opposite edges of said locking-plate contact with the bolts 11 11, while the opposite ends of said locking-plate are narrowed by the notches 17 cut therein, so that the width of the ends of said plate is the same as the distance between the nuts 14 14, located on opposite edges of the cross-plates 13 at the same end thereof. The opposite ends of the locking-plate 15 are bent upwardly and backwardly toward said locking-plate to form hooks 16 16, and these hooks bend over and engage the cross-plates 13, and when in its completed form said hooks serve to strengthen the device by holding the cross-plates against any tendency to move longitudinally of the spring 12, and thus prevent any spreading of the ends of the screw-threaded bolts 11. It is evident that in its completed form the locking-plate prevents the rotation or unscrewing of the nuts 14. Said locking-plate, therefore, performs the usual functions of the chafing-plate and in addition thereto prevents the nuts from unscrewing from the bolts and strengthens the whole structure.

It will be seen and understood that the hooked ends 16 16 upon my improved locking-plate 15 engaging the cross-plates or yokes 13 prevent the U-shaped bolts from spreading, and thus prevent the different leaves of the spring from moving or creeping one upon the other. This is a very important feature in my improved construction of wagons and carriages.

Having now described my invention, what I claim, and desire by Letters Patent to secure, is—

1. A wagon comprising in its construction an axle, a flat spring extending transversely of said axle, two U-shaped bolts extending around said axle upon opposite edges, respectively, of said spring, cross-plates extending transversely of said spring upon the opposite side from that upon which said axle is located and engaging the screw-threaded ends of said bolts, nuts securing said bolts to said cross-plates, and a chafing-plate located between said cross-plates and spring, the opposite ends of said chafing-plate bent around said cross-plates between and in contact with said nuts, whereby said nuts are prevented from rotating.

2. A wagon comprising in its construction an axle, a flat spring and cross-plates, said cross-plates and axle located upon opposite sides, respectively, of said spring, bolts and nuts therefor connecting said parts together, and a chafing-plate located between said cross-plates and spring, the opposite ends of said chafing-plate bent around said cross-plates between and in contact with said nuts, whereby said nuts are prevented from rotating.

In testimony whereof I have hereunto set my hand in presence of two subscribing witnesses.

JOHN WILLIAMS.

Witnesses:
CHARLES S. GOODING,
ANNIE J. DAILEY.